(12) United States Patent
Jeong et al.

(10) Patent No.: US 7,012,858 B1
(45) Date of Patent: Mar. 14, 2006

(54) METHOD FOR CHECKING THE EXISTENCE OF AN OPTICAL DISK USING A FOCUSING SIGNAL

(75) Inventors: Hong Jo Jeong, Kyunggi-do (KR); Hyeong-Chull Na, Kyunggi-do (KR)

(73) Assignee: LG Electronics Inc., Seoul (KR)

(*) Notice: Subject to any disclaimer, the term of this patent is extended or adjusted under 35 U.S.C. 154(b) by 426 days.

(21) Appl. No.: 09/711,302

(22) Filed: Nov. 14, 2000

(30) Foreign Application Priority Data

Dec. 10, 1999 (KR) ............................... 1999-56727
Dec. 10, 1999 (KR) ............................... 1999-56728

(51) Int. Cl.
*G11B 7/09* (2006.01)

(52) U.S. Cl. .............................. 369/44.11; 369/44.27; 369/44.41; 369/53.22; 369/53.23; 369/53.28; 369/53.37; 369/94

(58) Field of Classification Search ............. 369/44.29, 369/47.39, 44.32, 53.28, 53.37, 53.23, 30.25, 369/30.27, 47.49, 53.31, 44.11, 44.28, 44.35, 369/44.27, 44.41, 53.22, 94
See application file for complete search history.

(56) References Cited

U.S. PATENT DOCUMENTS

| | | | | |
|---|---|---|---|---|
| 5,079,755 A | * | 1/1992 | Hangai et al. ............ | 369/44.11 |
| 5,138,595 A | * | 8/1992 | Wachi ....................... | 369/44.35 |
| 5,140,575 A | * | 8/1992 | Fushiki .................... | 369/44.32 |
| 5,351,226 A | * | 9/1994 | Mizumoto et al. ........ | 369/47.39 |
| 5,903,531 A | * | 5/1999 | Satoh et al. .............. | 369/44.29 |
| 5,966,357 A | * | 10/1999 | Ryoo ........................ | 369/53.23 |
| 6,058,082 A | * | 5/2000 | Hwang ..................... | 369/44.27 |
| 6,240,054 B1 | * | 5/2001 | Takeya et al. ............ | 369/44.29 |

* cited by examiner

*Primary Examiner*—William Korzuch
*Assistant Examiner*—Kim-Kwok Chu

(57) ABSTRACT

A method for checking the existence of an optical disk using a focusing signal is provided. The method in accordance with the present invention prevents misjudgement of the existence of an optical disk which is caused by noise contained in a focus error signal or by the low reflection ratio of a disk.

4 Claims, 7 Drawing Sheets

FIG. 1

*Conventional Art*

FIG. 2A

*Conventional Art*

FIG. 2B

*Conventional Art*

FIG. 2C

*Conventional Art*

FIG. 2D

*Conventional Art*

METHOD FOR CHECKING THE EXISTENCE OF AN OPTICAL DISK USING A FOCUSING SIGNAL

BACKGROUND OF THE INVENTION

1. Field of the Invention

The present invention relates to a method for checking the existence of an optical disk, and more specifically, but not by way of limitation, to a method for checking the existence of an optical disk by using the focus error signal or focus OK signal yielded by comparison of a reference level with a beam strength signal.

2. Description of the Related Art

Figure 1:
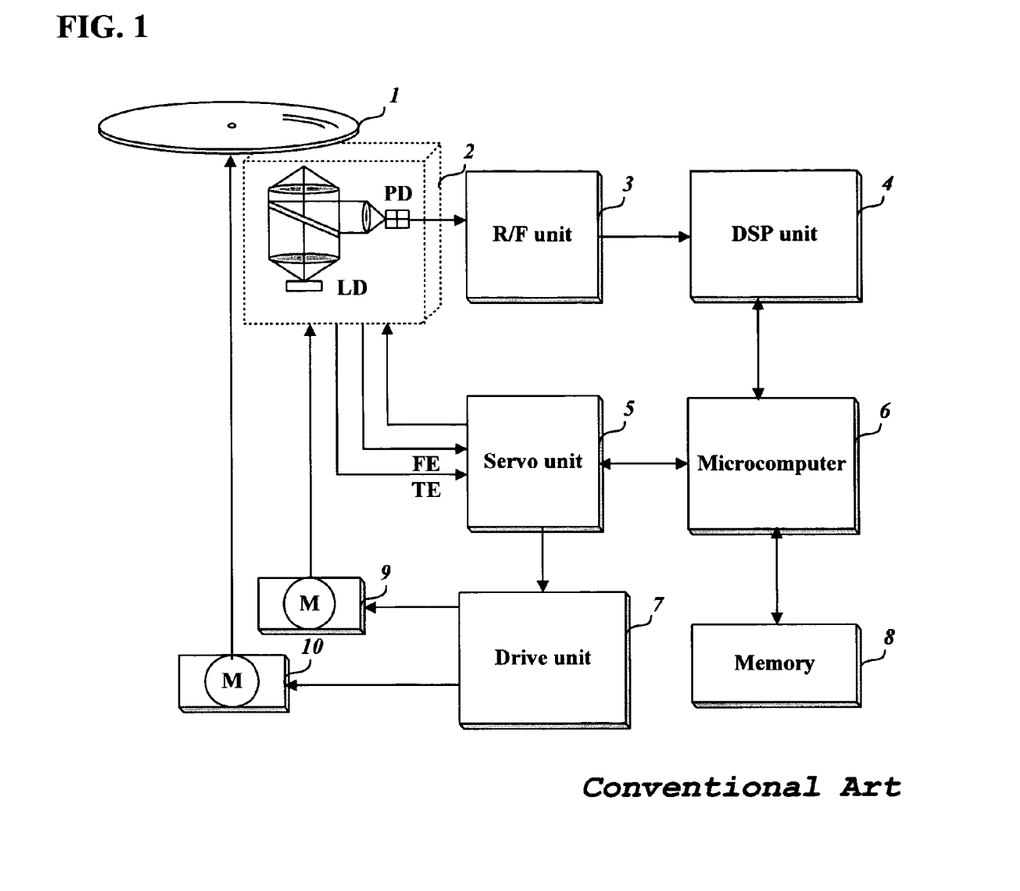
FIG. 1 is a block diagram for an optical disk drive.

FIG. 1 depicts a general optical disk drive system, comprising an optical pickup 2 for reproducing recorded signals from an optical disk 1, a sled motor 9 for moving the optical pickup 2 along the full length of the disk radius, a spindle motor 10 for rotating the optical disk 1, a drive unit 7 for driving the sled motor 9 and the spindle motor 10, an RF unit 3 for equalizing and shaping the RF signal reproduced from the optical disk 1 by the optical pickup 2, a servo unit 5 for controlling the optical pickup 2 and drive unit 7 using the rotation speed of the optical disk 1 and focus and tracking error signals outputted from the optical pickup 2, a digital signal processing unit 4 for retrieving original digital data from the binary data stream outputted by the RF unit 3, a microcomputer 6 for supervising the operation of the servo unit 5 and digital signal processing unit 4, and a memory 8 for storing data needed for the operation of the microcomputer 6. The focus error (FE) signal generated by the optical pickup 2 will be explained in detail with reference to FIGS. 2A to 2D.

Figure 2A:
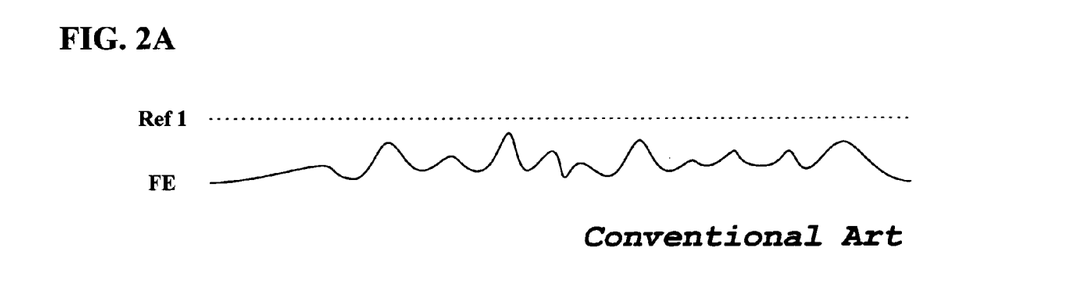
FIGS. 2A to 2D are several focus error signal waveforms measured under various environments.

FIG. 2A shows a focus error (FE) signal waveform generated by the optical pickup 2 in the case where no disk is contained in the disk tray of the optical disk drive. Since the incident laser beam is not reflected, the focus error signal is irregular and contaminated by a significant amount of noise, the level of the focus error signal being much lower than a prescribed reference level Ref1.

Figure 2B:
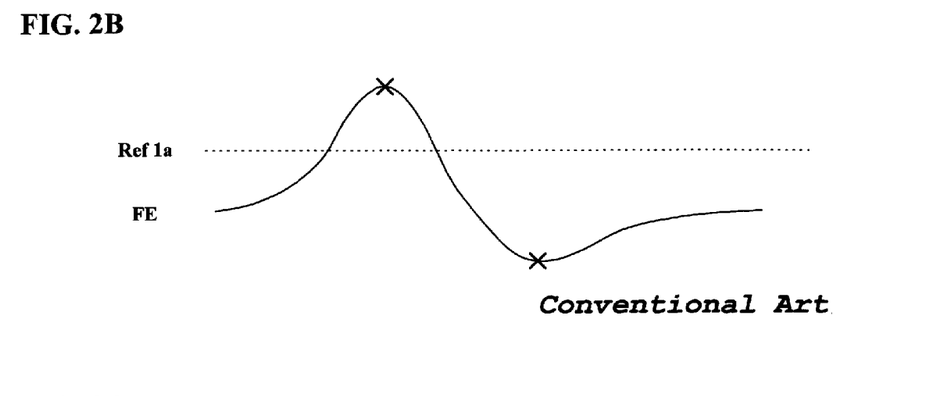

FIG. 2B shows a focus error signal waveform generated by the optical pickup 2 when an optical disk has been inserted into the disk tray. In this case, the focus error signal is of a sinusoidal waveform and the level is greater than the reference level Ref1a, the amount of noise being relatively small.

Figure 2C:
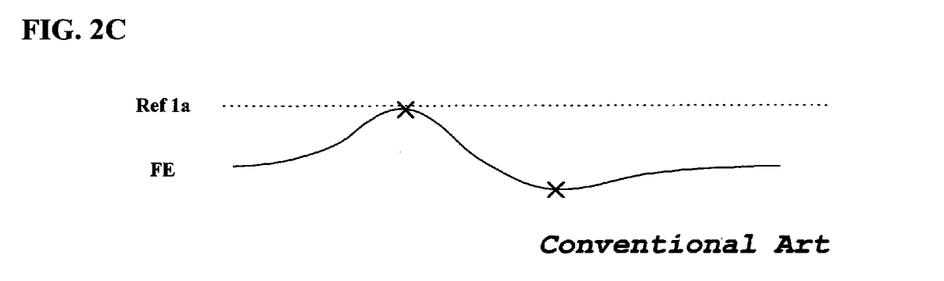

FIG. 2C shows a focus error signal waveform generated by the optical pickup 2 in the case where the disk tray contains an optical disk of a low reflection ratio such as a rewritable optical disk. The general shape of the focus error signal is similar to that in FIG. 2B, but the level of the focus error signal is lower because of the low reflection ratio of the optical disk. Therefore, it is likely that the level of the focus error signal does not exceed the reference level Ref1a and the existence of the optical disk is not detected. To solve this problem, the reference level should be lowered enough to detect the optical disk with a low reflection ratio.

Figure 2D:
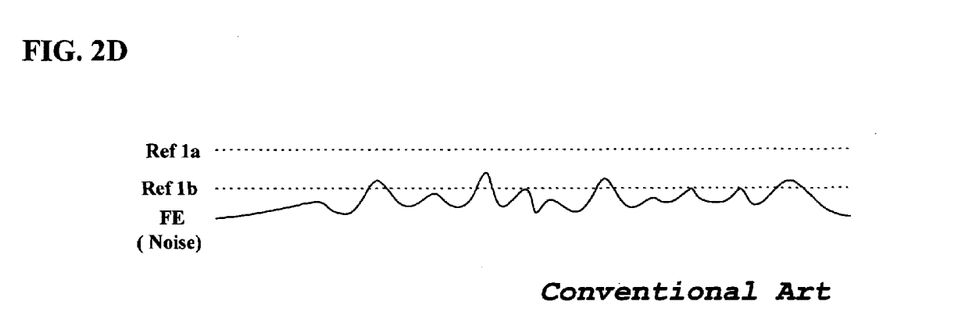

If a low reference level Ref1b is employed, an optical disk with a low reflection ratio can be detected as long as the level of the focus error signal exceeds the low reference level Ref1b. In this case, however, it is possible that the level of the focus error signal obtained in the case of no disk goes up the reference level Ref1b as shown in FIG. 2D, which leads to a wrong disk detection result.

SUMMARY OF THE INVENTION

It is an object of the present invention to provide a method for checking the existence of an optical disk using a focus OK signal that prevents misjudgment caused by noise contained in a focus error signal.

It is another object of the present invention to provide a method for checking the existence of an optical disk by comparing the sum of focus error of which the level is less than a prescribed reference level with another reference level.

The method for checking the existence of an optical disk using a focusing signal in accordance with an embodiment of the present invention comprises examining whether a focus OK signal is asserted while moving an optical pickup in the direction of the place where the optical disk is placed, starting the detection of the value of focus error if the focus OK signal is asserted, and judging the existence of an optical disk depending upon the magnitude of detected value.

The method for checking the existence of an optical disk using a focusing signal in accordance with another embodiment of the present invention comprises examining whether the peak of a focus error signal exceeds a predefined reference level, while moving an optical pickup in the direction of the place where the optical disk is placed, detecting and summing the magnitude of focusing signal after the peak is detected, and judging the existence of an optical disks depending upon the magnitude of the sum value.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 3:
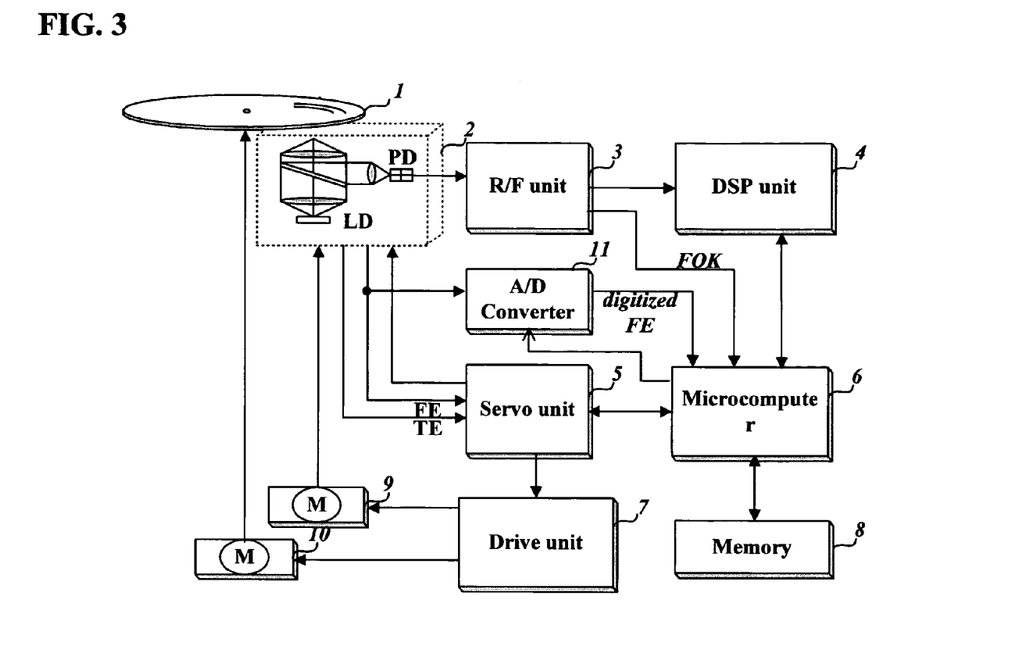
FIG. 3 is a block diagram of an optical disk drive embodying the present invention.

FIG. 3 shows an optical disk drive embodying the present invention, comprising an optical pickup 2 for reproducing recorded signals from an optical disk 1, a sled motor 9 for moving the optical pickup 2 along the full length of the disk radius, a spindle motor 10 for rotating the optical disk 1, a drive unit 7 for driving the sled motor 9 and the spindle motor 10, an RF unit 3 for equalizing and shaping the RF signal reproduced from the optical disk 1 by the optical pickup 2 and for creating a focus OK (FOK) signal, a servo unit 5 for controlling the optical pickup 2 and drive unit 7 using the rotation speed of the optical disk 1 and focusing and tracking error signals outputted from the optical pickup 2, a digital signal processing unit 4 for retrieving original digital data from the binary data stream outputted by the RF unit 3, an A/D converter 11 for digitizing the focus error signal from the optical pickup 2, a microcomputer 6 for supervising the operation of the servo unit 5 and digital signal processing unit 4 and for checking the existence of an optical disk using the digitized focus error signal and the focus OK (FOK) signal, and a memory 8 for storing data needed for the operation of the microcomputer 6.

Figure 4:
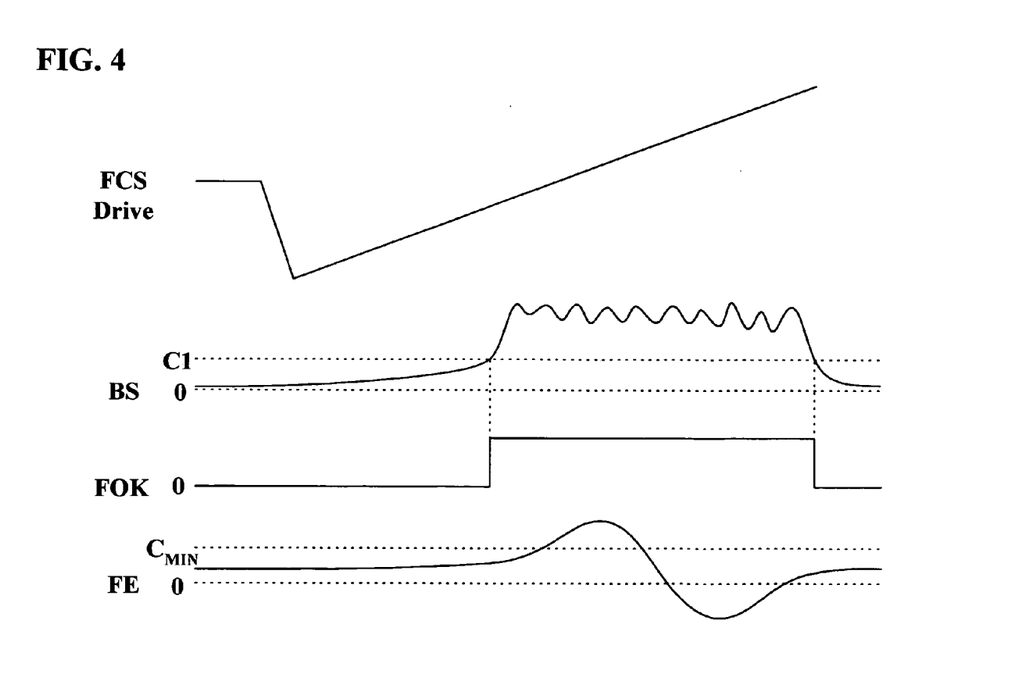
FIG. 4 shows waveforms of signals used by the method for checking the existence of an optical disk in accordance with an embodiment of the present invention.

FIG. 4 shows the waveforms of four signals used by an embodiment of the present invention for checking the existence of an optical disk. The first signal is the focus drive signal corresponding to the focus control signal (FCS) created by the servo unit 5. The second signal is the beam strength signal (BS) outputted by the optical pickup 2 while the objective lens moves in response to the focus drive signal. In a 3-beam optical pickup, the sub-beam-added signal is generally used as the beam strength signal. In a 1-beam optical pickup, however, the beam strength signal is derived from the filtered RF signal. The third signal is the focus OK (FOK) signal created by comparing the beam strength (BS) signal and a predefined reference signal C1 set low enough to detect the existence of a rewritable optical disk. The last signal is the focus error signal. The method for checking the existence of an optical disk using these signals will be explained in detail with reference to the block diagram in FIG. 3 and a flowchart shown in FIG. 5.

Figure 5:
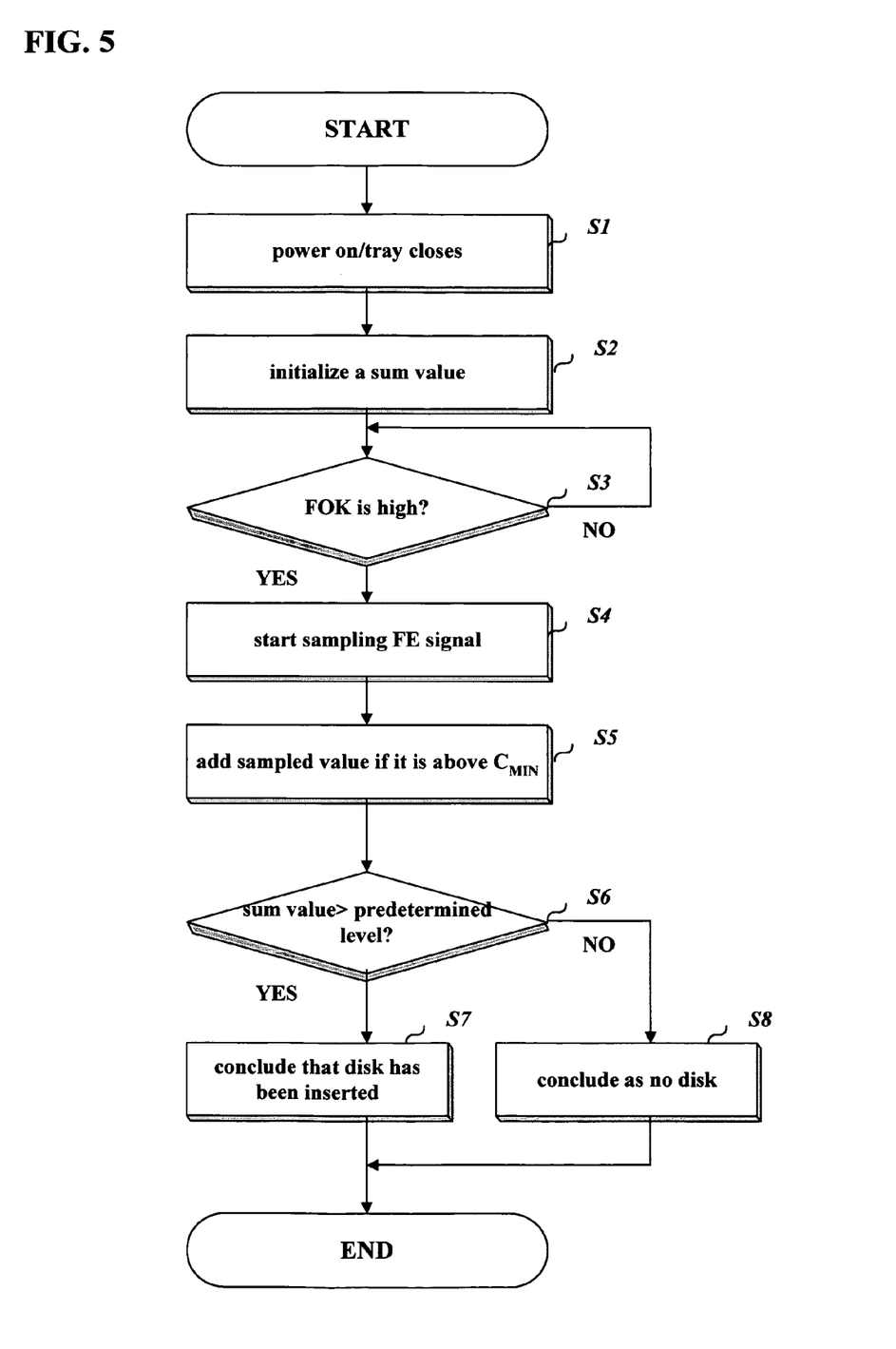
FIG. 5 is a flowchart of the method for checking the existence of an optical disk in accordance with an embodiment of the present invention.

When the disk tray closes or the optical disk drive is at power-on (S1), the microcomputer 6 initializes a sum value (S2) and starts focus search. In response to the focus search command, the servo unit 5 outputs the focus control signal to move the objective lens. The RF unit 3 generates the focus OK (FOK) signal by comparing the beam strength (BS) signal with a predefined reference level C1.

Figure 6A:
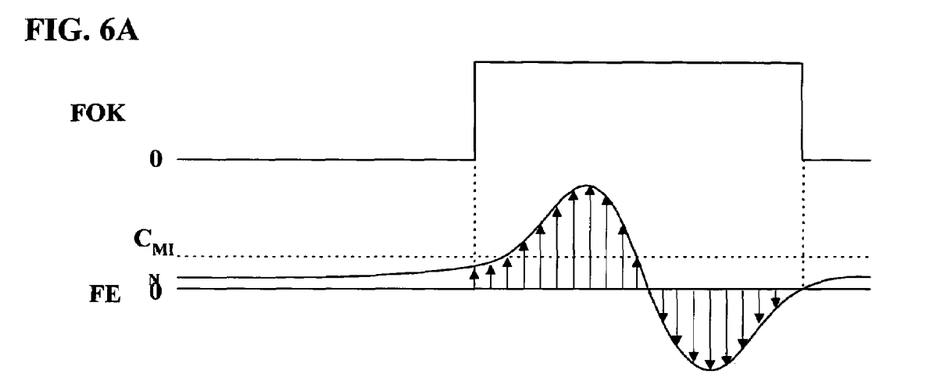
FIGS. 6A to 6C are waveforms of focus OK signal and focus error signal obtained when a disk exists and when it does not.

The microcomputer 6 examines the state of the focus OK (FOK) signal (S3) and starts A/D conversion of the focus error signal if the focus OK signal is asserted (S4). Therefore, A/D conversion of the focus error signal is performed only while the level of the focus OK signal is high, as shown in FIG. 6A. Then, the microcomputer 6 adds the digitized focus error to the sum value only if the digitized error exceeds a predetermined reference level $C_{MIN}$ (S5).

Finally, the microcomputer 6 compares the sum value with a predetermined level set for disk detection (S6) and concludes that an optical exists if the sum value is greater than the predetermined level (S7).

Figure 6B:
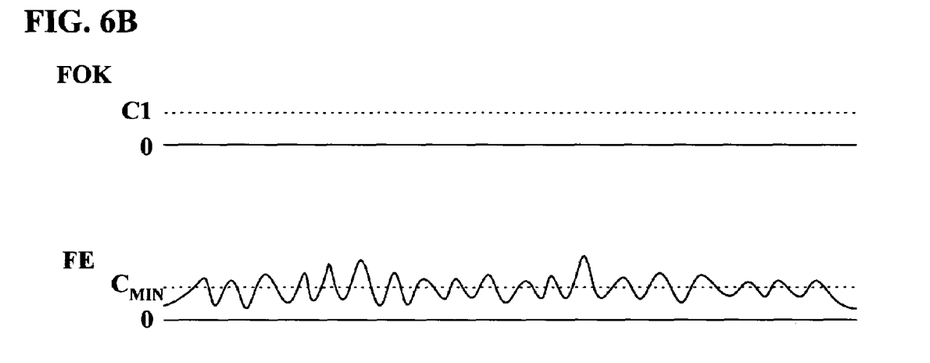

Even when an optical disk does not exist, the focus error signal may exceed the reference level $C_{MIN}$ because of noise as shown in FIG. 6B. In this case, however, the focus OK (FOK) signal is not asserted and therefore the focus error signal is not digitized, which makes the sum variable remain unchanged. Consequently, the microcomputer 6 concludes no disk to exist (S8) and misjudgment due to noise is prevented.

Figure 6C:
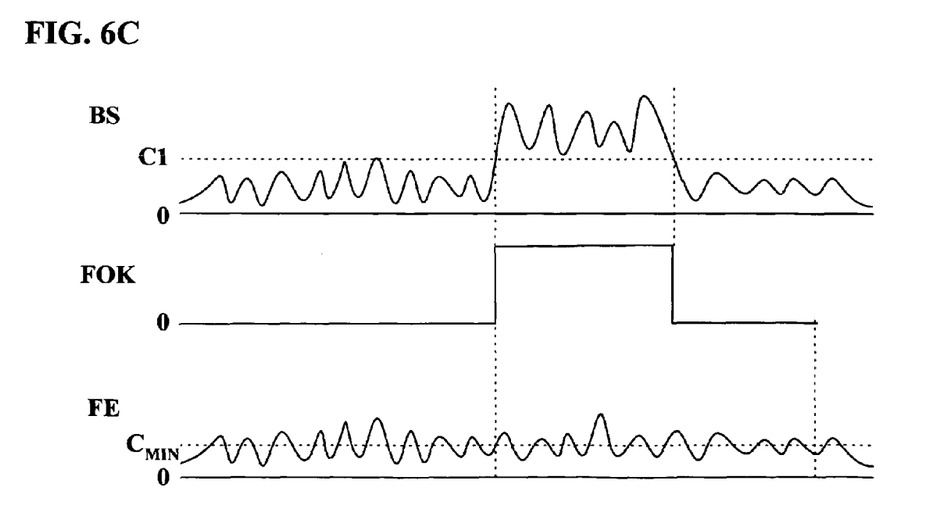

The focus OK signal might be asserted by a burst noise as shown in FIG. 6C. In this case, however, the duration of the high state of the focus OK signal is relatively short compared to that created in a normal situation. Since the focus error signal is sampled only during the short interval, the sum of the sampled focus error is likely to be lower than the predefined level. In addition, even if the duration of the asserted focus OK signal is long, the sum of the sampled focus error is not likely to exceed the level because the focus error signal is generated only by noise.

As a result, the existence of an optical disk can be checked with no misjudgment by sum of the digitized focus error sampled only while the focus OK signal is asserted, despite the existence of noise.

Figure 7A:
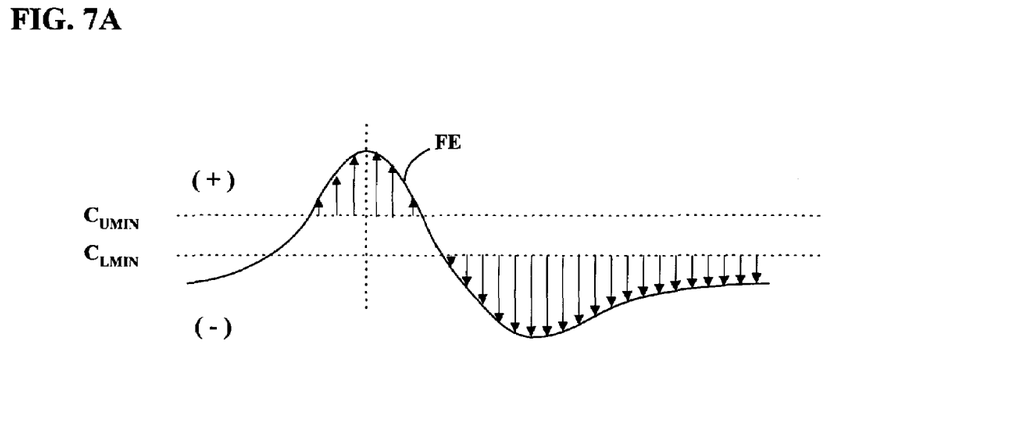
FIGS. 7A to 7C are waveforms of focus error signal used by the method for checking the existence of an optical disk in accordance with another embodiment of the present invention.
Figure 7B:
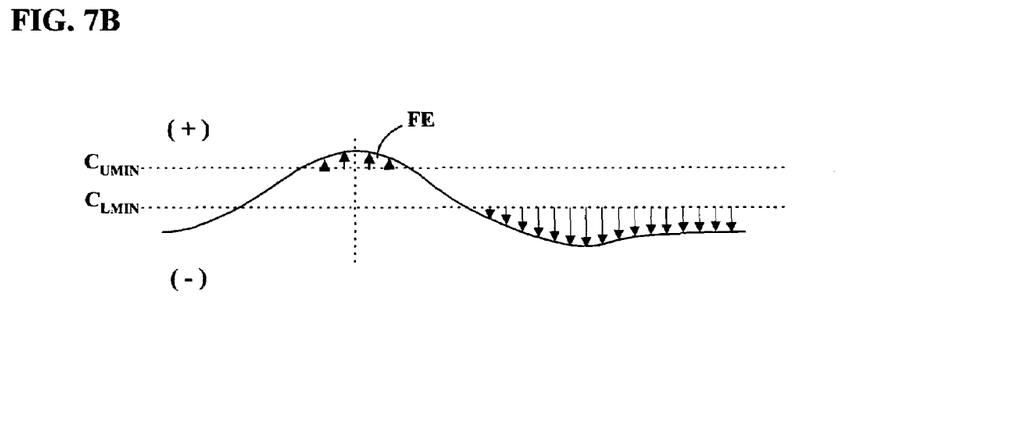
Figure 7C:
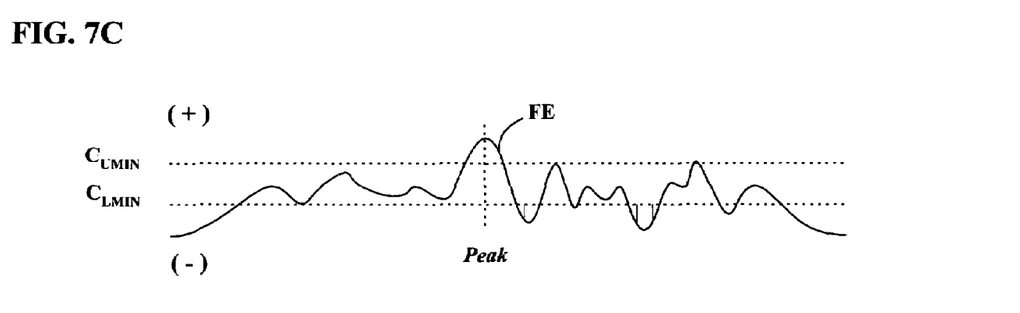

FIGS. 7A to 7C show focus error signal waveforms used by another embodiment of the present invention. FIG. 7A shows a typical waveform of normal focus error signal obtained when an optical disk exists in the disk tray. It is seen that the peak level of the focus error is greater than a high reference level $C_{UMIN}$ as well as than a low reference level $C_{LMIN}$.

FIG. 7B shows an example waveform of the focus error signal generated by a rewritable optical disk. Owing to the low reflection ratio of the rewritable optical disk, the peak level of the focus error is greater than the low reference level $C_{LMIN}$ but less than the high reference level $C_{UMIN}$.

FIG. 7C shows an example waveform of the focus error signal obtained when no disk is contained in the disk tray. It is seen that the focus error signal is irregular and seriously contaminated by noise and the peak value may exceed the low reference level $C_{LMIN}$, without exceeding the high reference level $C_{UMIN}$.

For correct detection of the existence of an optical disk, therefore, the difference of the two waveforms shown in FIGS. 7B and 7C should be discerned. Such discrimination can be achieved by using the focus error signal lower than the low reference level $C_{LMIN}$. The sampled focus error of which the level is lower than the low reference level $C_{LMIN}$ is added and compared with a predefined reference level since the signal below the low reference level $C_{LMIN}$ is insensitive to a noise. Table 1 gives the added absolute values obtained by experiments in each case.

TABLE 1

|  | Rewritable disk | | No disk | |
| --- | --- | --- | --- | --- |
|  | Above zero (+) | Below zero (−) | Above zero (+) | Below zero (−) |
| 1 | 898Eh | 6122h | 5FA7h | 0000h |
| 2 | 8B23h | 530Fh | 86BFh | 0000h |
| 3 | 6B70h | 66C7h | 8D08h | 0000h |
| 4 | 7232h | 63D3h | 7420h | 0000h |
| 5 | 7790h | 63B4h | 88A0h | 0000h |
| 6 | 908Eh | 5CBAh | 7D09h | 0000h |
| 7 | 66e6h | 6302h | 72F2h | 0000h |
| 8 | 870Dh | 6666h | 7D27h | 0000h |
| 9 | 8D0Bh | 561Ch | 6F1Eh | 0000h |
| 10 | 8495h | 5A8Ah | 7156h | 0000h | h = hexadecimal

It is shown that in the case of an optical disc with a low reflection ratio, the sum of the absolute values of focus error less than the low reference level $C_{LMIN}$ is much greater than 0, whereas in the case of no disk, the sum value is near 0. This fact implies that the two cases can be clearly discriminated if an appropriate reference level between the two sum values is chosen. The method in accordance with another embodiment of the present invention explained in detail with reference to FIG. 8.

Figure 8:
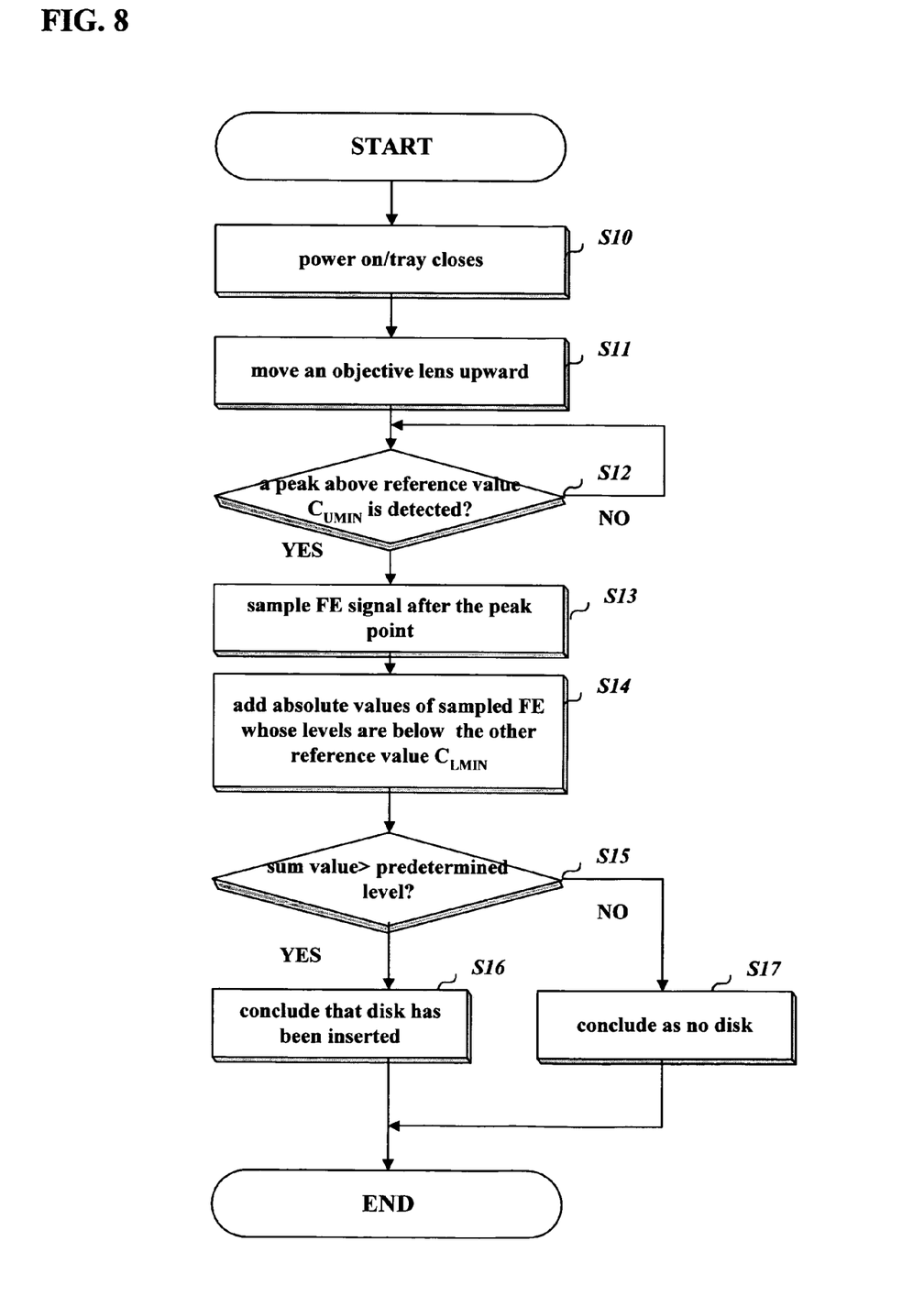
FIG. 8 is a flowchart of the method for checking the existence of an optical disk in accordance with another embodiment of the present invention.

When the disk tray closes or the optical disk drive is at power-on (S10), the objective lens moves upward to find a focus point (S11). The microcomputer 6 digitizes the focus error signal at a constant rate, detects the peak point, and compares the peak level with a high reference level $C_{UMIN}$ (S12). Only when the peak level is greater than the high reference level $C_{UMIN}$, the microcomputer 6 samples the focus error signal for a given time duration (S13) after the peak is detected. And the microcomputer 6 adds the absolute values of the sampled focus error of which the level is lower than a low reference level $C_{LMIN}$ (S14) and then compares the sum value with a predefined value (S15). If the sum value is less than the predefined value, the microcomputer 6 concludes that a disk does not exist (S17). Otherwise, it concludes that a disk has been inserted (S16).

It is possible to add the absolute values, which are above the noise level, separately according to the sign of the focus error and to make a decision by comparing the smaller value with the reference level.

The method for checking the existence of an optical disk in accordance with the present invention prevents misjudgment of the existence of an optical disk which are caused by noise contained in the focus error signal or low reflection ratio of a disk.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for checking the existence of an optical disk in a disk drive using a focus error signal, comprising the steps of:
    (a) receiving a focus error signal;
    (b) sampling the received focus error signal at constant intervals;
    (c) summing the values of the sampled focus error signal, which are less than a first predetermined reference level;
    (d) determining whether the summed value is greater than a predetermined judging level;
    (e) judging the existence of the optical disk in the disk drive based on the result in the determining step (d);
    wherein the step (b) is started when the value of the focus error signal exceeds the first predetermined reference level, while moving an optical pickup; and
    wherein the predetermined reference level includes first and second predetermined reference levels, where the first predetermined reference level is for starting said sampling step (b) and the second predetermined reference level is for sampling the focus error signal.

2. The method set forth in claim 1, wherein the first predetermined reference level is higher than the second predetermined reference level.

3. A method for checking the existence of an optical disk in a disk drive using a focus error signal, comprising the steps of:
    (a) receiving a focus error signal;
    (b) sampling the received focus error signal at constant intervals;
    (c) summing the values of the sampled focus error signal, which are less than a first predetermined reference level;
    (d) determining whether the summed value is greater than a predetermined judging level;
    (e) judging the existence of the optical disk in the disk drive based on the result in the determining step (d); and
    wherein a focus error value is added to the summed value if the error value is greater than the predetermined reference level.

4. An apparatus for checking the existence of an optical disk in a disc drive using a focus error signal, comprising:
    an optical pickup for outputting the focus error signal;
    an analog-to-digital converter for sampling the focus error signal at constant intervals;
    a microcomputer for determining the existence of the optical disk in the disk drive by summing the values of the sampled focus error signal, which are less than a first predetermined reference level, and determining whether the summed value is greater than a predetermined judging level; and
    wherein a focus error value is added to the summed value if the error value is greater than the predetermined reference level.

* * * * *